United States Patent
Kumar et al.

(10) Patent No.: US 9,303,626 B2
(45) Date of Patent: Apr. 5, 2016

(54) CONTROL SYSTEM AND METHOD FOR MITIGATING LOADS DURING YAW ERROR ON A WIND TURBINE

(71) Applicant: General Electric Company, Schenectady, NY (US)

(72) Inventors: Rajeeva Kumar, Clifton Park, NY (US); Charudatta Subhash Mehendale, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 663 days.

(21) Appl. No.: 13/718,387

(22) Filed: Dec. 18, 2012

(65) Prior Publication Data

US 2014/0169964 A1    Jun. 19, 2014

(51) Int. Cl.
*F03D 7/02* (2006.01)

(52) U.S. Cl.
CPC ............ *F03D 7/0204* (2013.01); *F03D 7/0224* (2013.01); *F05B 2270/329* (2013.01); *Y02E 10/723* (2013.01)

(58) Field of Classification Search
CPC ................. F03D 7/0224; F03D 7/0204; F05B 2270/329; Y02E 10/723
See application file for complete search history.

(56) References Cited

U.S. PATENT DOCUMENTS

| | | | |
|---|---|---|---|
| 5,289,041 A * | 2/1994 | Holley | 290/44 |
| 6,320,272 B1 * | 11/2001 | Lading et al. | 290/44 |
| 7,175,389 B2 * | 2/2007 | Moroz | 416/1 |
| 7,352,075 B2 | 4/2008 | Willey et al. | |
| 7,476,985 B2 | 1/2009 | Llorente Gonzalez | |
| 7,891,944 B2 | 2/2011 | Jeppesen et al. | |
| 7,950,901 B2 | 5/2011 | Barbu et al. | |
| 8,096,762 B2 | 1/2012 | Risager et al. | |
| 8,162,608 B2 | 4/2012 | Birkemose et al. | |
| 8,890,349 B1 * | 11/2014 | Lynch et al. | 290/44 |
| 2007/0018457 A1 * | 1/2007 | Llorente Gonzalez | 290/44 |
| 2009/0148286 A1 | 6/2009 | Kammer et al. | |
| 2009/0220340 A1 | 9/2009 | Pierce et al. | |
| 2010/0014969 A1 | 1/2010 | Wilson et al. | |
| 2011/0193343 A1 | 8/2011 | Nakashima et al. | |
| 2011/0229300 A1 | 9/2011 | Kanev et al. | |
| 2012/0009062 A1 | 1/2012 | Ingram et al. | |

OTHER PUBLICATIONS

Muljadi et al., "Pitch-Controlled Variable-Speed Wind Turbine Generation", IEEE Transactions on Industry Applications, vol. 37, Issue 1, pp. 240-246, Jan./Feb. 2001.

(Continued)

*Primary Examiner* — Igor Kershteyn
(74) *Attorney, Agent, or Firm* — Ann M. Agosti

(57) ABSTRACT

A control system for mitigating loads on a wind turbine comprising a plurality of blades in yaw error events includes a yaw error calculation unit for calculating a yaw error of the wind turbine, a pitch angle reference command calculation unit for calculating a plurality of pitch angle reference commands respectively corresponding to the plurality of blades at least based on the calculated yaw error, and a controller for producing a plurality of pitch commands at least based on the plurality of pitch angle reference commands, to respectively regulate the pitch angles of the plurality of blades.

20 Claims, 12 Drawing Sheets

(56) References Cited

OTHER PUBLICATIONS

Bossanyi, "Wind Turbine Control for Load Reduction", Wind Energy, vol. 6, Issue 3, pp. 229-244, 2003.

Xingjia et al., "Individual Pitch Control for Variable Speed Turbine Blade Load Mitigation", IEEE International Conference on Sustainable Energy Technologies, ICSET, pp. 769-772, Nov. 24-27, 2008, Location: Singapore.

* cited by examiner

CONTROL SYSTEM AND METHOD FOR MITIGATING LOADS DURING YAW ERROR ON A WIND TURBINE

BACKGROUND

Embodiments of the disclosure relate generally to wind turbines and, more particularly, for mitigating loads during yaw error conditions experienced by wind turbines.

A utility-scale wind turbine typically includes a set of two or three large rotor blades mounted to a hub. The rotor blades and the hub together are referred to as a rotor. The rotor blades aerodynamically interact with the wind and create lift and drag, which is then translated into a driving torque by the rotor. The rotor is attached to and drives a main shaft, which in turn is operatively connected via a drive train to a generator or a set of generators that produce electric power. The main shaft, the drive train and the generator(s) are all situated within a nacelle, which rests on a yaw system that continuously pivots along a vertical axis to keep the rotor blades facing in the direction of the prevailing wind current to generate maximum torque.

In certain circumstances, the wind direction can shift faster than the response of the yaw system, which can result in a yaw error. Yaw error is typically defined as the difference (e.g., angular difference) between the orientation of the wind turbine nacelle and the wind direction and occurs when the wind turbine nacelle is not aligned with the wind. During such aforementioned transient wind events, the yaw error, which can be sustained for a few seconds or minutes (until the yaw system points the wind turbine nacelle to face the wind), might damage the wind turbine if operation of the wind turbine continues. Specifically, during such operation of the wind turbine, yaw error can result in unacceptably high loads on the rotor blades, hub, tower, and other components thereof, which can result in damage.

Yaw error can be avoided by actively adjusting the orientation of the wind turbine nacelle with the yaw system, i.e. by keeping the wind turbine nacelle pointed directly into the wind. However, as mentioned above, the wind direction may shift quite rapidly and faster than the response of the yaw system. A technique proposed in the past handles extreme yaw error by simply shutting down the wind turbine in those extreme yaw error conditions and then restarting once the wind turbine nacelle is properly oriented into the wind. When the wind turbine shut down is initiated, it goes through a shut down cycle and then a startup cycle, which results in several minutes of lost energy production. In addition, high mechanical loading can occur on turbine components if the shutdown procedure is not tailored to an extreme yaw error condition.

Therefore, there is a need for new and improved control systems and methods for mitigating loads during extreme yaw error on a wind turbine.

BRIEF DESCRIPTION

A control system for mitigating loads during yaw error on a wind turbine is provided in accordance with one embodiment of the invention. The control system includes a yaw error calculation unit for calculating a yaw error of the wind turbine; a pitch angle reference command calculation unit for calculating a plurality of pitch angle reference commands respectively corresponding to a plurality of wind turbine blades at least based on the calculated yaw error; and a controller for producing a plurality of pitch commands at least based on the plurality of pitch angle reference commands, to respectively regulate the pitch angles of the plurality of blades.

A control method for mitigating loads during yaw error on a wind turbine is provided in accordance with one embodiment of the invention. The control method includes calculating a yaw error of the wind turbine; calculating a plurality of pitch angle reference commands respectively corresponding to a plurality of wind turbine blades at least based on the calculated yaw error; and producing a plurality of pitch commands at least based on the plurality of pitch angle reference commands, to respectively regulate the pitch angles of the plurality of blades.

A control system for mitigating loads on a wind turbine including a plurality of blades comprises: a controller for producing a plurality of pitch commands, to respectively regulate the pitch angles of the plurality of blades; and an individual blade pitch control unit for producing a plurality of pitch angle compensation commands to respectively compensate the plurality of pitch commands; wherein the plurality of pitch angle compensation commands are calculated by calculating the difference between a plurality of respective mean angles of attack or inflow angles of the plurality of blades and the corresponding average value.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE DISCLOSURE

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items.

Figure 1:
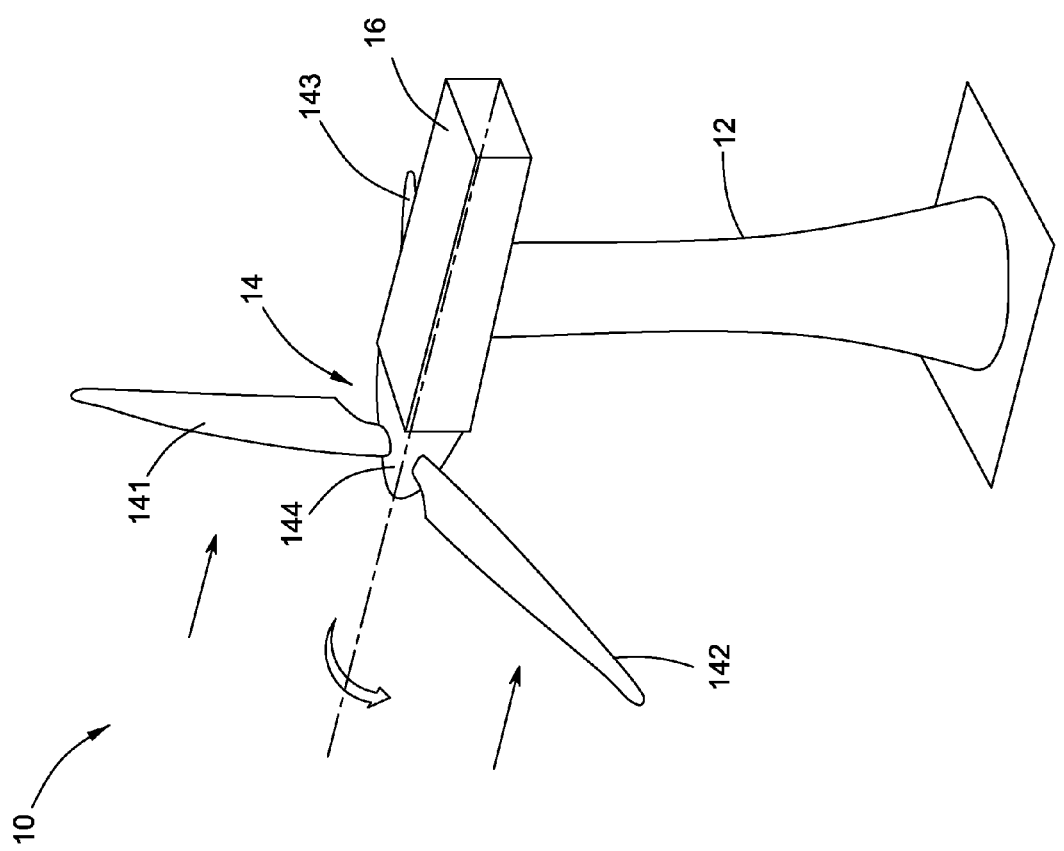
FIG. 1 is a schematic diagram of a wind turbine.

Referring to FIG. 1, an exemplary wind turbine 10 is shown. While all the components of the wind turbine 10 have not been shown and/or described, a typical wind turbine 10 may include a tower 12 and a rotor 14. The rotor 14 may include a plurality of blades (for example three blades 141, 142, and 143) connected to a hub 144. The blades 141-143 may rotate with wind energy and the rotor 14 may transfer that energy to a main shaft (not shown) situated within a nacelle 16. The nacelle 16 may optionally include a drive train (not shown), which may connect the main shaft on one end to one or more generators (not shown) on the other end. Alternatively, the generator(s) may be connected directly to the main shaft in a direct drive configuration. The generator(s) may generate power, which may be transmitted through the tower 12 to a power distribution panel (PDP) and a pad mount transformer (PMT) for transmission to a grid (not shown). The nacelle 16 may be positioned on a yaw system, which may pivot about a vertical axis to orient the nacelle 16 in the direction of the wind current.

In addition to the aforementioned components, the wind turbine 10 may also include a control system 20 (FIG. 2) may be situated within the nacelle 16 for controlling the various components of the wind turbine 10, for example controlling the pitch (e.g., angle of blades with respect to the wind direction) of the blades 141-143, controlling the rotor speed, controlling the power, controlling the torque, etc. The wind turbine 10 may also include multiple sensors (not shown) mounted on different positions of the wind turbine 10 to sense/measure multiple parameters, such as power, rotor speeds, vibrations, deflections, load, wind speed, wind direction, wind shear/veer, etc. The following paragraphs and figures will mainly describe the pitch control part of the control system 10 in detail, which is used to solve the yaw error problem. The other control parts of the control system 10 may use conventional strategies which are not described in detail, or may be changed according to the pitch control part and will be described as well. Furthermore, FIG. 1 only shows an exemplary wind turbine 10 to explain a general working process for a general wind turbine. In other embodiments, the wind turbine 10 may comprise a different type of wind turbine.

Figure 2:
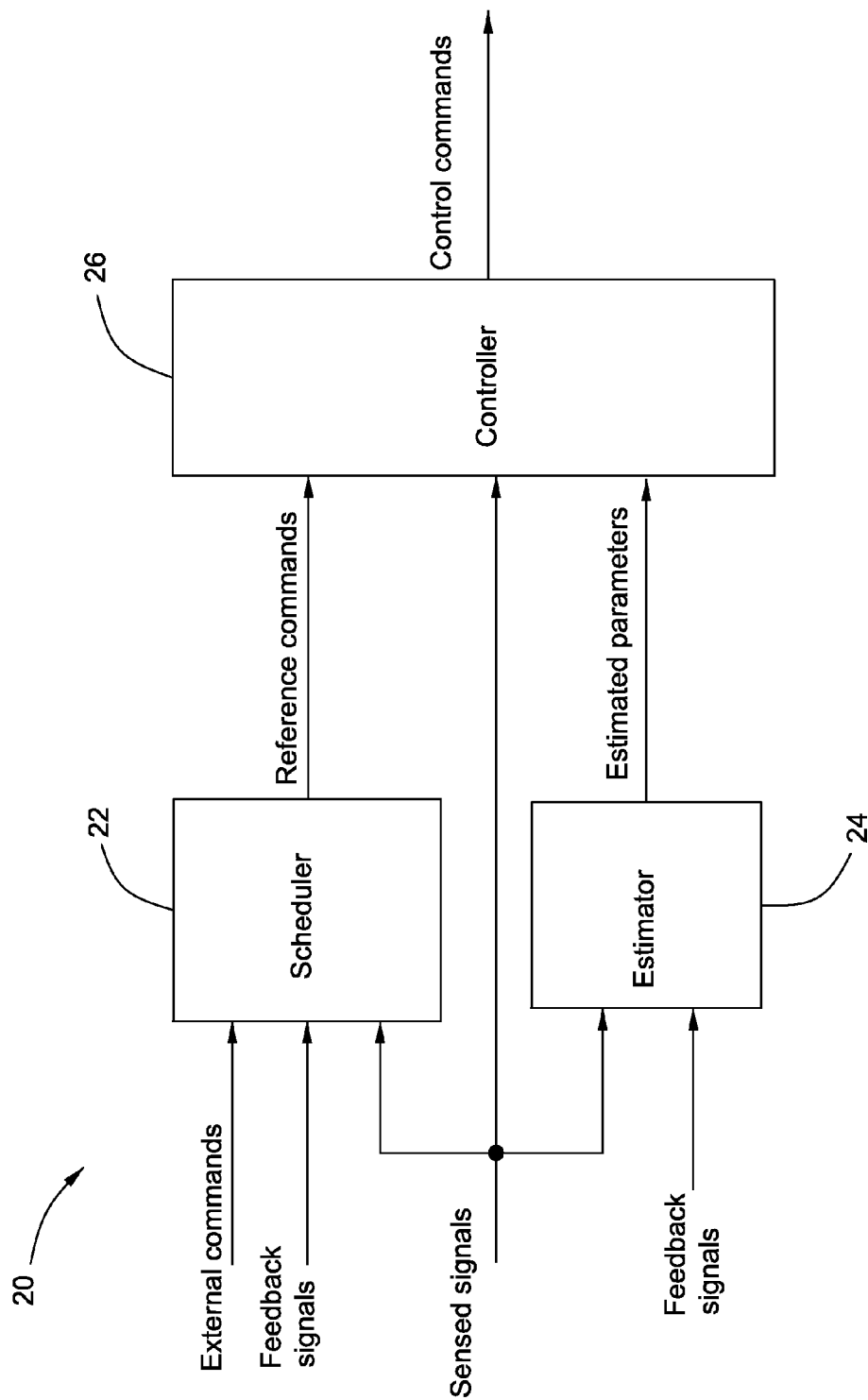
FIG. 2 is a schematic block diagram of a control system of a wind turbine, in accordance with at least some embodiments of the present disclosure.

Referring to FIG. 2, an exemplary control system 20 of the wind turbine 10 is shown, in accordance with at least some embodiments of the present disclosure. While all the components of the control system 20 have not been shown and/or described, a typical control system 20 may include a scheduler 22, an estimator 24, and a controller 26. FIG. 2 only shows an exemplary control system 20 to explain a general controlling process for a general wind turbine 10. In other embodiments, the control system 20 may comprise other components or just comprise one control unit which integrates all functions therein.

In general, the scheduler 22 is used to receive some external commands and sensed signals/feedback signals, and then calculate corresponding reference commands based on the received reference commands and sensed signals/feedback signals, for providing control reference commands to the controller 26. For example, the external commands may include reference angle of attack (AoA) commands, power curtailment commands, ramp rate control commands, noise reduced operation commands, which may be generated from a wind farm management system (not shown). The sensed signals/feedback signals may include power, rotor speed, vibrations, deflections, loads, wind speed, wind shear/veer signals, etc., sensed by the sensors or read directly from a controller memory (not shown). These reference commands may include power reference commands, rotor speed reference commands, pitch angle reference commands, generator torque reference commands, control mode reference commands, etc. The following paragraphs and figures will describe some exemplary embodiments of the pitch control part (FIGS. 4 and 9), the power control part and the rotor speed control part (FIG. 8) of the scheduler 22 in detail.

In general, the estimator 24 is used to receive sensed signals and feedback signals, and then estimate/calculate some parameters that are not directly measured. The feedback signals may include current values of pitch and torque feedback signals. The feedback signals may be sensed or read directly from a controller memory (not shown). The estimated parameters may include average wind speed, tower and blade velocities, etc. It is understood that the estimator 24 can use appropriate algorithms to estimate these parameters, which are well-known technology and thus not described in detail.

In general, the controller 26 is used to receive the reference commands from the scheduler 22, the estimated parameters from the estimator 24, and the sensed signals from the sensors, and then calculate corresponding control commands to control the wind turbine 10 based on those received commands, parameters, and signals. The control commands may include pitch commands, generator torque commands, yaw angle or rate commands etc. In some embodiments, the controller 26 may use any appropriate conventional algorithm to achieve such control commands. In some other embodiments, an individual blade pitch control unit 28 (see FIGS. 10, 11, and 12) is used to cooperate with the controller 26 to generate compensated pitch commands for further mitigating loads during yaw error on the wind turbine 10. In other embodiments, other functions of additional control units may be introduced to cooperate with the controller 26 to implement different functions for controlling the wind turbine 10 according to other requirements.

Figure 3:
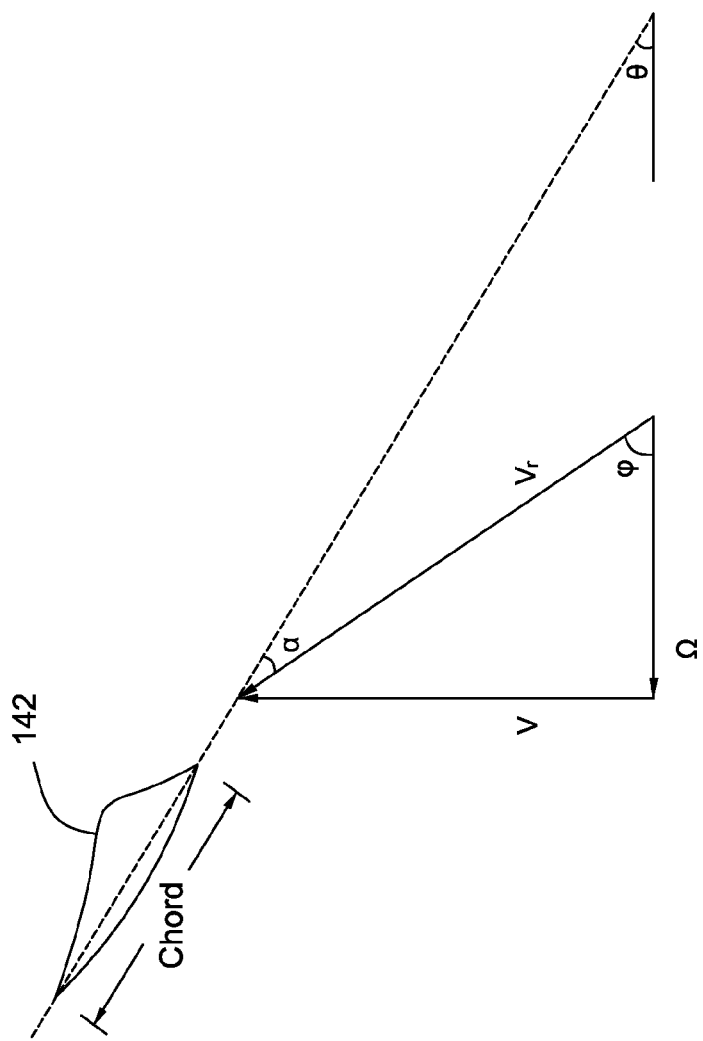
FIG. 3 is a schematic diagram of an example blade of the wind turbine of FIG. 1, together showing some parameters of the blade.

Referring to FIG. 3, a schematic diagram of an example blade 142 of the wind turbine 10 of FIG. 1 is shown. Here, r stands for a blade span location, φ stands for an inflow angle, a stands for an angle of attack (AoA), V stands for a wind speed (velocity), $V_r$ stands for a resultant relative wind speed at the radius r, Ω stands for a rotational velocity of the blade 142. It is understood that the resultant relative wind speed $V_r$ has contributions from the wind speed V and the rotational velocity Ω. When ignoring the 3-dimensional flow effect, the inflow angle φ at the blade span location r is approximated as:

$$\varphi(r) = \tan^{-1} \frac{V\cos\beta}{V\sin\beta\cos\lambda + r\Omega} \quad \text{Eq. 1}$$

In other embodiments, a more detailed expression for inflow angle may further include other parameters, such as wind shear, wind upflow angle, shaft tilt, blade pre-cone angle, blade structural twist angle, tower bending, etc.

A mean value of the angle of attack (AoA) $\alpha_m$ is defined as:

$$\alpha_m = \text{mean}(\phi(r)) - \theta \quad \text{Eq. 2}$$

Where φ(r) is the inflow angle φ on the blade 142 as a function of the blade span location r, mean(φ(r)) is a mean value of φ(r), Ω stands for the rotor speed, β stands for a wind direction in inertial reference frame, λ stands for a blade azimuth angle, θ stands for a blade pitch angle.

The above equations Eq. 1 and Eq. 2 are general equations used to calculate the mean value of angle of attack $\alpha_m$. On a blade 142, the produced load (force) is dominated by aerodynamic loads, and these aerodynamic loads depend on distribution of AoA along the blade span, which may be approximated by the mean value of the angle of attack $\alpha_m$ at certain span locations at the corresponding blade 142. Therefore, if there is a need to reduce the produced load, reducing the angle of attack α at a blade 142 can reduce the produced load produced on the corresponding blade 142 correspondingly. Since most of aerodynamic loads are produced by span location of the blade 142 far away from the root section, a mean angle of attack $\alpha_m$ can be determined through averaging the inflow angle φ over span as in the equation Eq1 and using the equation Eq2. In at least some embodiments, the mean value for the inflow angle φ(r) for each blade 141, 142, or 143 is calculated as the mathematical average value of inflow angles obtained over 60%-90% of that blade span of the corresponding blade 141, 142, or 143, for example over 75% of that. Furthermore, the angle of attack α can be modified by the blade pitch angle θ, thus the blade pitch angle θ can be controlled to reduce the angle of attack α. In other embodiments, depending upon different conditions, such as the location of the wind turbine 10, the height and size of the tower 12 and the rotor 14 for example, the calculating range of the mean value for the inflow angle φ(r) (namely for the angle of attack α) may vary accordingly. In other embodiments, the inflow angle φ of each individual blade 141, 142, or 143 may be determined by other equations, or directly determined by sensors, or determined by other methods. In some embodiments, the mean value for the inflow angle φ(r) over certain blade sections also includes inflow angle values at a single location.

Figure 4:
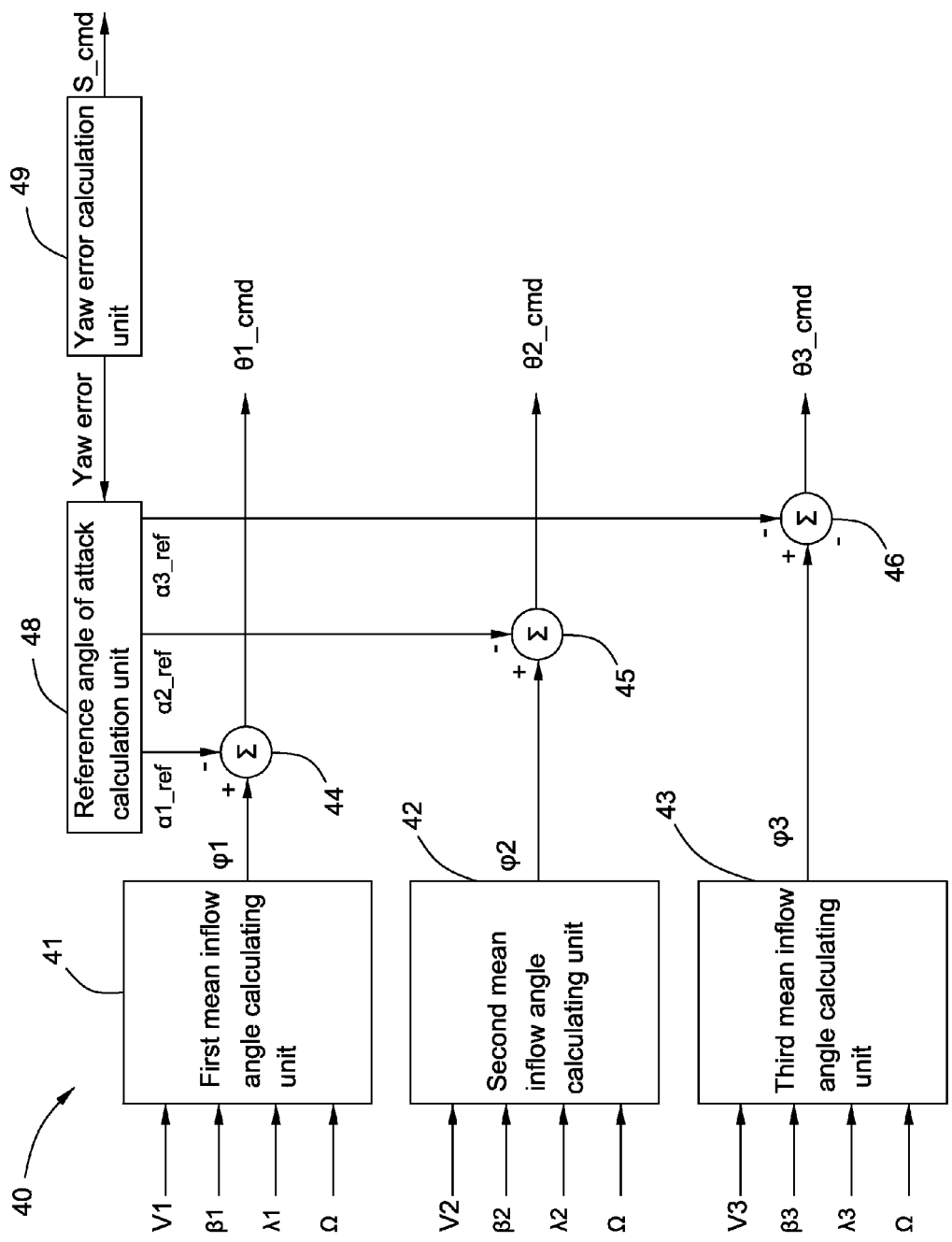
FIG. 4 is a schematic diagram of a control block for mitigating loads during yaw error on a wind turbine, in accordance with one embodiment of the present disclosure.
Figure 5:
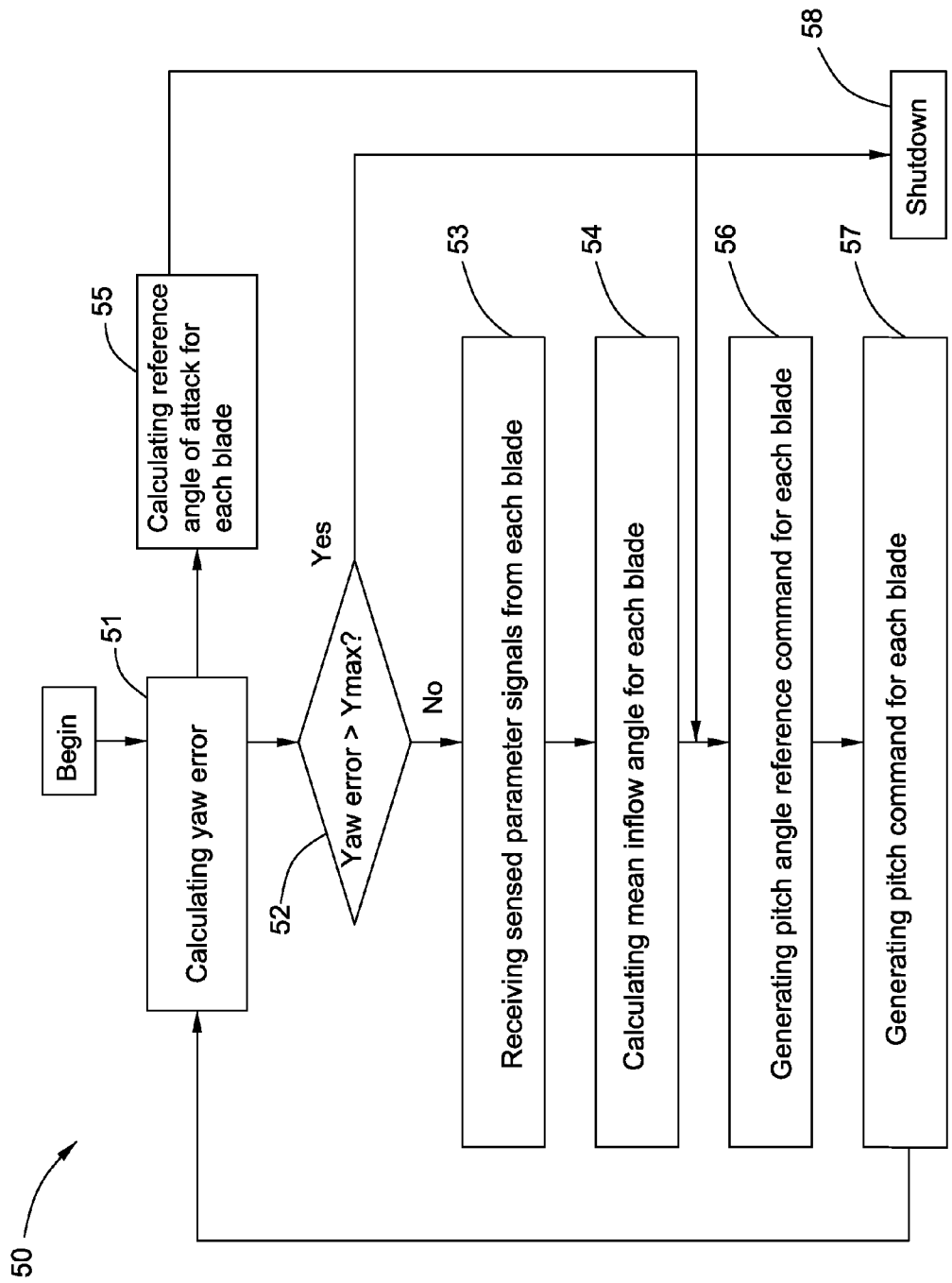
FIG. 5 is a flowchart of a control method for mitigating loads during yaw error on a wind turbine, in accordance with at least some embodiments of the present disclosure.

Referring to FIG. 4 and FIG. 5 together, FIG. 4 shows a schematic diagram of a control block 40 of the scheduler 22, for mitigating loads during yaw error on the wind turbine 10, and FIG. 5 shows a flowchart of a control method 50 for mitigating loads during yaw error on the wind turbine 10 corresponding to the control block 40, in accordance with one embodiment of the present disclosure. In FIG. 4, the control block 40 only shows a pitch control part in the scheduler 22, which is used to provide pitch angle reference commands (θ1_cmd, θ2_cmd, θ3_cmd) to the controller 26 for every blade 141, 142, 143, and the other control parts in the scheduler 22 are not shown in FIG. 4. As an example, the number of the blades 141, 142, 143 is three, V1, V2 and V3 are first to third wind speeds respectively corresponding to first to third blades 141, 142, and 143; β1, β2, and β3 are first to third wind directions in inertial reference frame respectively corresponding to the first to third blades 141, 142, and 143; λ1, λ2, and λ3 are first to third blade azimuth angles respectively corresponding to the first to third blades 141, 142, and 143; and Ω is the rotor speed. In some embodiments, these above parameter signals may be pre-processed in advance, for example by averaging over time, such as in a 5-10 second moving average window, to smooth these parameter signals. In some embodiments, the first to third wind speeds V1, V2, V3 may be equal, the first to third wind directions β1, β2, and β3 may be equal.

In step 51, as shown in FIG. 5, parameters, such as yaw error, which may affect the response of the wind turbine 10 (in mitigating loads) may be calculated/computed. Specifically, the yaw error in particular may be described as the angular difference between the orientation of the wind turbine 10 generally or the horizontal rotational axis of the rotor 14 more specifically, and the actual direction of the wind. The yaw error is calculated by a yaw error calculation unit 49 which may comprise for example, a sonic anemometer, a wind vane, or a forward looking remote sensing device.

In step 52, in at least some embodiments, it may be determined whether the calculated yaw error is greater than a predetermined maximum allowable yaw error Ymax. Depending upon the location of the wind turbine 10, height and size of the tower 12 and the rotor 14 and other related conditions such as wind speed etc., the predetermined maximum allowable yaw error Ymax may vary. If the calculated yaw error is greater than the predetermined maximum allowable yaw error Ymax, the yaw error calculation unit 49 outputs a shutdown command S_cmd to shut the wind turbine 10 down to avoid damaging the wind turbine 10 (step 58). If the calculated yaw error is not greater than the predetermined maximum allowable yaw error Ymax, the process proceeds to the step 53. In other embodiments, the shutdown control condition may vary based on different shutdown conditions.

In step 53, the control block 40 receives parameter signals from each blade 141, 142, 143. In at least some embodiments, the control block 40 includes a first mean inflow angle calculation unit 41, a second mean inflow angle calculation unit 42, and a third mean inflow angle calculation unit 43. The first mean inflow angle calculation unit 41 is used to receive parameter signals of the first wind speed V1, the first wind direction β1, the first blade azimuth angle λ1, and the rotor speed Ω of the first blade 141. The second mean inflow angle calculation unit 42 is used to receive parameter signals of the second wind speed V2, the second wind direction β2, the second blade azimuth angle λ2, and the rotor speed Ω of the second blade 142. The third mean inflow angle calculation unit 43 is used to receive parameter signals of the third wind speed V3, the third wind direction β3, the third blade azimuth angle λ3, and the rotor speed Ω of the third blade 143. These parameter signals V1-V3, λ1-λ3, Ω may be determined by various sensors (not shown) provided within the wind turbine 10, or determined by other methods. The first to third wind directions β1-β3 may be determined based on the calculated yaw error according to appropriate algorithms or may be determined by other methods. In some embodiments, the first to third wind speeds V1-V may be equal, the first to third wind direction β1-β3 may be equal, under some conditions.

In step 54, the first mean inflow angle calculation unit 41 is also used to calculate a first mean inflow angle φ1 of the first blade 141 according to above received parameter signals V1, β1, λ1, Ω, the above equation Eq. 1, and a predetermined mean range. The second mean inflow angle calculation unit 42 is used to calculate a second mean inflow angle φ2 of the second blade 142 according to above received parameter signals V2, β2, λ2, Ω, the above equation Eq. 1, and a predetermined mean range. The third mean inflow angle calculation unit 43 is used to calculate a third mean inflow angle φ3 of the third blade 143 according to above received parameter signals V3, β3, λ3, Ω, the above equation Eq. 1, and a predetermined mean range. In at least some embodiments, the mean value of the inflow angle (φ1, φ2, φ3) is calculated as the mathematical average value of inflow angles obtained over 60%-90% of that blade span of the corresponding blade 141, 142, 143. In other embodiments, the mean inflow angle of each blade may be determined according to other parameter signals and other mathematical equations based on aerodynamic principles. If the mean value is calculated as inflow angle values at a single location, the predetermined mean range can be omitted.

In step 55, first to third reference angle of attack α1_ref, α2_ref, α3_ref are calculated based on the calculated yaw error of the wind turbine 10 and a predefined load limit. The first to third reference angle of attack α1_ref, α2_ref, α3_ref are determined to make sure each asymmetric load on the first to third blades 141, 142, and 143 falls within safe range respectively, based on the predefined load limit. In at least some embodiments, the first to third reference angle of attack α1_ref, α2_ref, α3_ref may be calculated through simulation software, such as Flex5 simulation software or the like. It is understood that these simulation software tools can dynamically simulate the real working status of the wind turbine 10 to calculate angle of attack under different yaw error conditions. In other embodiments, the first to third reference angle of attack α1_ref, α2_ref, α3_ref may be calculated by other methods, such as predetermined equations based on the yaw error for example, and the first to third reference angle of attack α1_ref, α2_ref, α3_ref may be equal in some conditions. As shown in FIG. 4, the control block 40 may include a reference angle of attack calculation unit 48 to calculate the reference angle of attack α1_ref, α2_ref, α3_ref based on the step 55 mentioned above.

In step 56, first to third pitch angle reference commands θ1_cmd, θ2_cmd, θ3_cmd respectively corresponding to the first to third blades 141, 142, and 143 are generated based on the equation Eq.2. In at least some embodiments, for generating the first to third pitch angle reference commands θ1_cmd, θ2_cmd, θ3_cmd, the control block 40 further includes a first subtraction element 44, a second subtraction element 45, and a third subtraction element 46. The first subtraction element 44 subtracts a first reference (mean) angle of attack α1_ref from the first mean inflow angle φ1 and provides the first pitch angle reference command θ1_cmd representing a difference between the first mean inflow angle φ1 and the first reference angle of attack α1_ref. The second subtraction element 45 subtracts a second reference angle of attack α2_ref from the second mean inflow angle φ2 and provides the second pitch angle reference command θ2_cmd representing a difference between the second mean inflow angle φ2 and the second reference angle of attack α2_ref. The third subtraction element 46 subtracts a third reference angle of attack α3_ref from the third mean inflow angle φ3 and provides the third pitch angle reference command θ3_cmd representing a difference between the third mean inflow angle φ3 and the third reference angle of attack α3_ref. In this embodiment, the first mean inflow angle calculation unit 41, the second mean inflow angle calculation unit 42, the third mean inflow angle calculation unit 43, the angle of attack calculation unit 48, and the three subtraction elements 44, 45, 46 together act as a pitch angle reference command calculation unit used to calculate the first to third pitch angle reference commands θ1_cmd, θ2_cmd, θ3_cmd corresponding to the first to third blades 141, 142, 143 respectively.

In step 57, the controller 26 receives the calculated first to third pitch angle reference commands θ1_cmd, θ2_cmd, θ3_cmd, and other reference commands from the scheduler 22 and receives the estimated parameters from the estimator 24 and the sensed signals from the sensors, and then calculates corresponding control commands to control the wind turbine 10. Because the pitch angle reference commands θ1_cmd, θ2_cmd, θ3_cmd provide reference for mitigating loads during yaw error, the control commands, such as pitch commands on each of the blades 141, 142, 143 and the torque commands generated by the controller 26 can mitigate loads during yaw error. After the adjusted control commands are generated based on the calculated first to third pitch angle reference commands θ1_cmd, θ2_cmd, θ3_cmd, the process proceeds back to the step 51, and thus this control block 40 can provide the pitch angle reference commands θ1_cmd, θ2_cmd, θ3_cmd during operation of the wind turbine 10 for mitigating loads during yaw error thereof.

Figure 6:
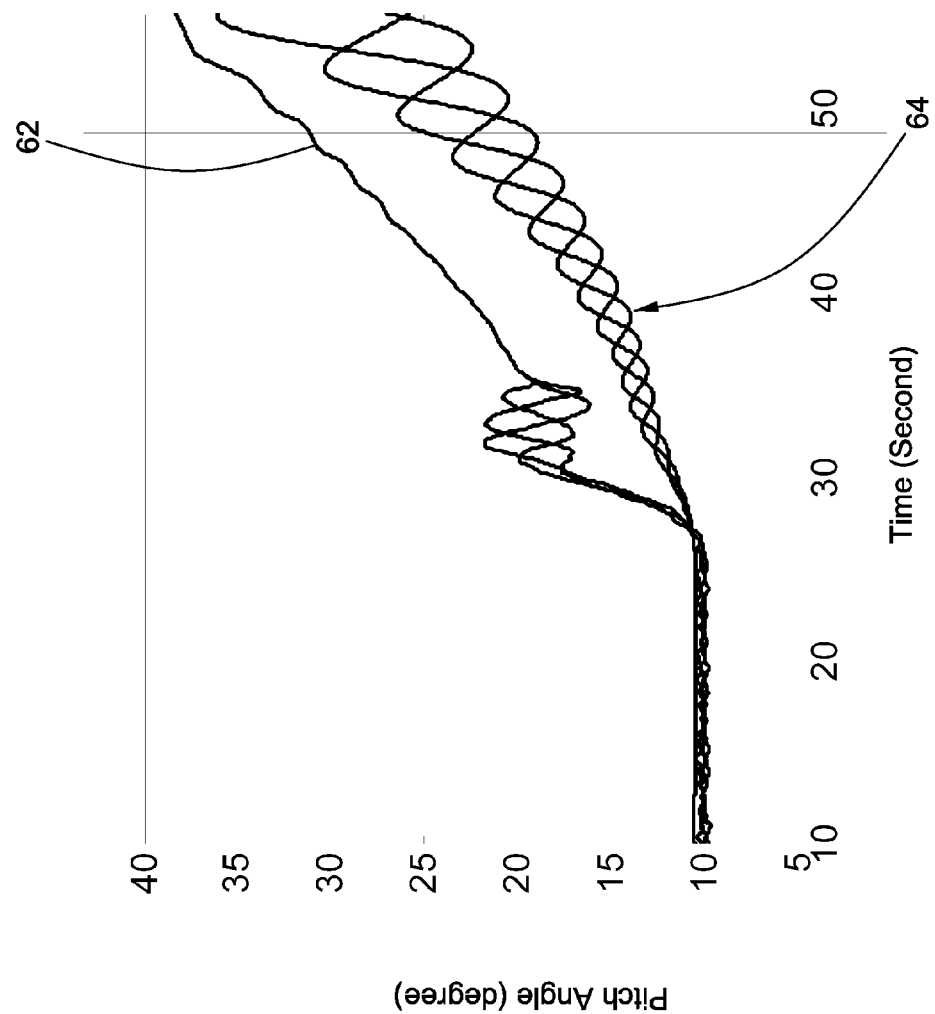
FIG. 6 is a comparison diagram of a simulation of a trend of pitch angles of three blades when not controlled by the control method of FIG. 5 and a trend of pitch angles of three blades when controlled by the control method of FIG. 5.

FIG. 6 is a comparison diagram of a simulation of a trend 62 of pitch angles of three blades when not controlled by the control method 50 of FIG. 5 and a trend 64 of pitch angles of three blades when controlled by the control method 50 of FIG. 5. When not controlled by the control method 50 of FIG. 5, the pitch angles of three blades are controlled almost simultaneously and to same adjusting degrees. However, for the control method 50 of FIG. 5, the pitch angles of three blades are controlled respectively corresponding individual first to third blades. Namely, the control method 50 respectively controls the pitch angles of the three blades based on the yaw error respectively affected on each individual blade, which can reduce imbalance load on the three blades and then improve effect on mitigating loads.

Figure 7:
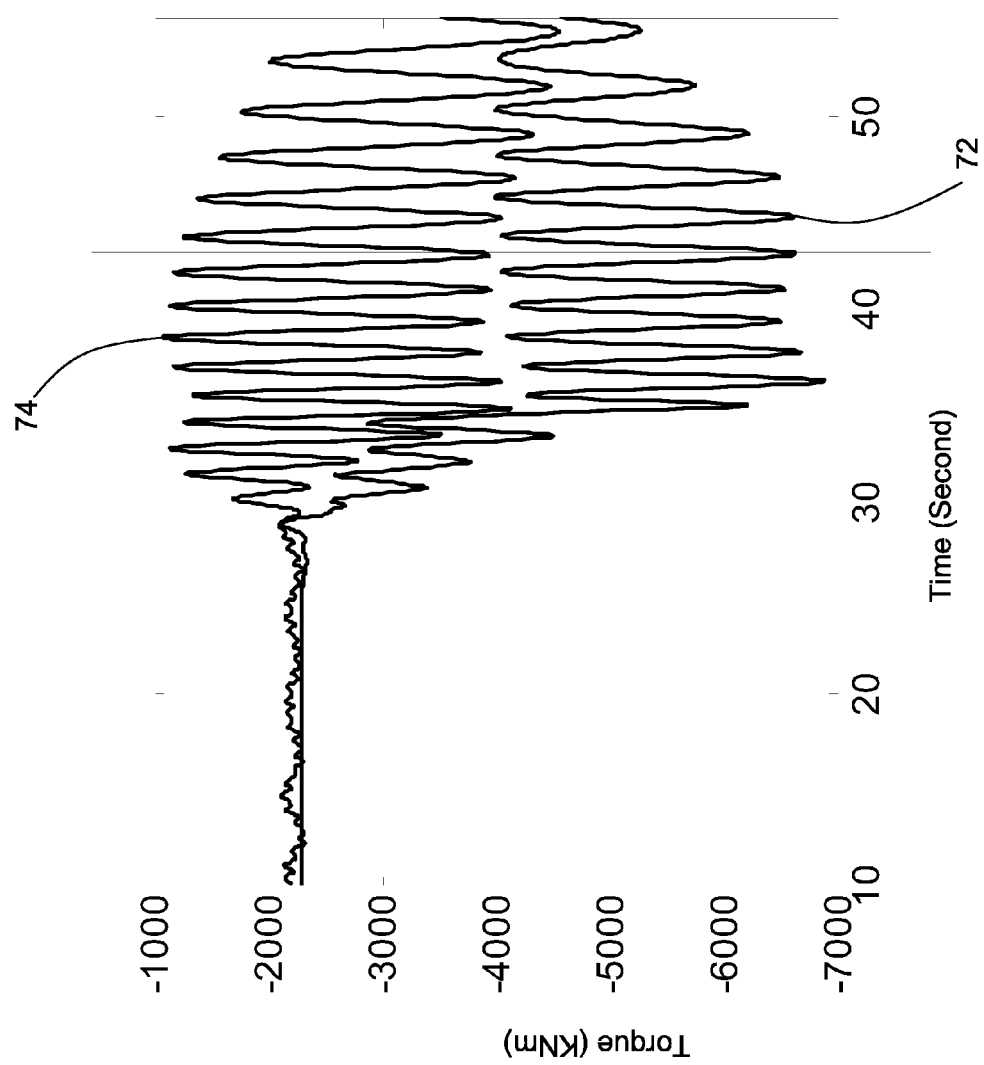
FIG. 7 is a comparison diagram of a simulation of a trend of a resultant load of a wind turbine not controlled by the control method of FIG. 5 and a trend of a resultant load of a wind turbine controlled by the control method of FIG. 5 while maintaining the rotor speed the same as in the conventional control method.

FIG. 7 is a comparison diagram of a simulation of a trend 72 of a resultant load of a wind turbine not controlled by the control method 50 of FIG. 5 and a trend 74 of a resultant load of a wind turbine controlled by the control method 50 of FIG. 5 while maintaining the rotor speed the same as in the conventional control method. The trend 72 of the resultant load when not controlled by the control method 50 of FIG. 5 is greater than the trend 74 of the resultant load under the control method 50 of the present disclosure. Thus the control method 50 is viewed as being an improvement, due to the control method 50 controlling the pitch angles of the three blades 141,142, and 143 respectively while not controlling the pitch angles of the three blades 141, 142, and 143 to the same degree.

In other embodiments, the control method 50 may combine other control methods together to reduce the influence of the yaw error, for example combine a speed control method to modify the related speeds such as rotor speed, generator speed, and the like. In one embodiment, the rotor speed may be determined by one or more of the calculated yaw error, the measured wind speed, or other related parameters. For example, Eq. 1 suggests that maintaining a higher rotor speed $\Omega$ will result in smaller inflow angle variations across the three rotor blades 141, 142, 143, leading to lower asymmetric bending loads on the rotor.

Figure 8:
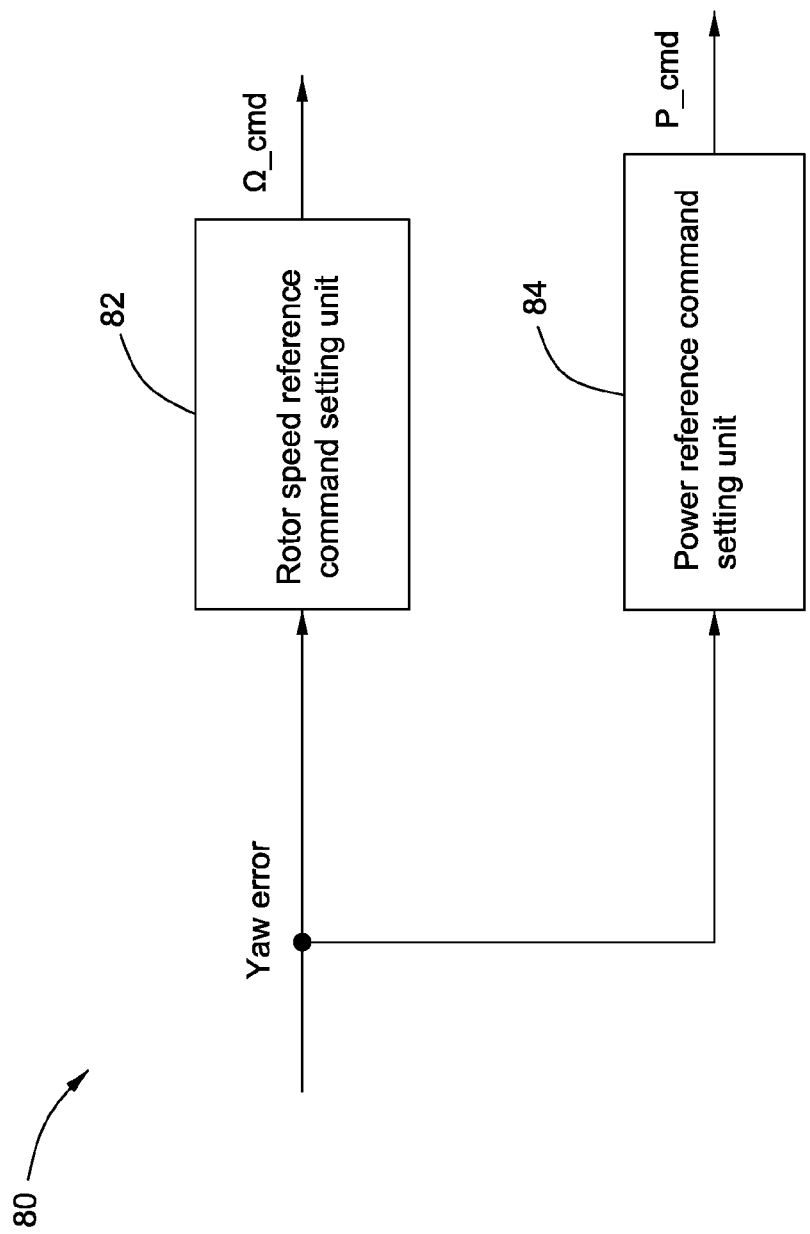
FIG. 8 is a schematic diagram of a control block for further providing rotor speed and power setting control during yaw error on a wind turbine, in accordance with at least some embodiments of the present disclosure.

As an example, FIG. 8 shows a schematic diagram of a control block 80 of the scheduler 22, for further providing rotor speed and power setting control combined with the pitch control mentioned above. The control block 80 includes a rotor speed reference command setting unit 82 and a power reference command setting unit 84. The rotor speed reference command setting unit 82 is used to receive the yaw error calculated by the yaw error calculation unit 49 (see FIG. 4), and then estimate/calculate a rotor speed reference command $\Omega\_cmd$ based at least on the yaw error or based on the yaw error and other related parameters. The controller 26 will produce a rotor speed command (not shown) at least according to the rotor speed reference command $\Omega\_cmd$, to regulate the rotor speed of the wind turbine 10. In one embodiment, the rotor speed reference command $\Omega\_cmd$ is predetermined according to the real yaw error and wind speed through appropriate algorithms. In one embodiment, the rotor speed reference command $\Omega\_cmd$ may only include a high speed mode used for the yaw error condition, and a normal speed mode used for a normal working status.

Similarly, the power speed reference command setting unit 84 is used to receive the yaw error calculated by the yaw error calculation unit 49 (see FIG. 4), and then estimate/calculate a power reference command P_cmd based at least on the yaw error or based on the yaw error and other related parameters. The controller 26 will produce power command (not shown) at least according to the power reference command P_cmd, to regulate the power of the wind turbine 10. In one embodiment, the power reference command P_cmd is predetermined according to the real yaw error, wind speed, wind direction, load measurement, etc., through appropriate algorithms. In other embodiments, other control parameters such as torque may be also calculated based on the yaw error, which is used to generate corresponding control commands (like the pitch commands) of the controller 26, to further mitigating loads during yaw error.

Figure 9:
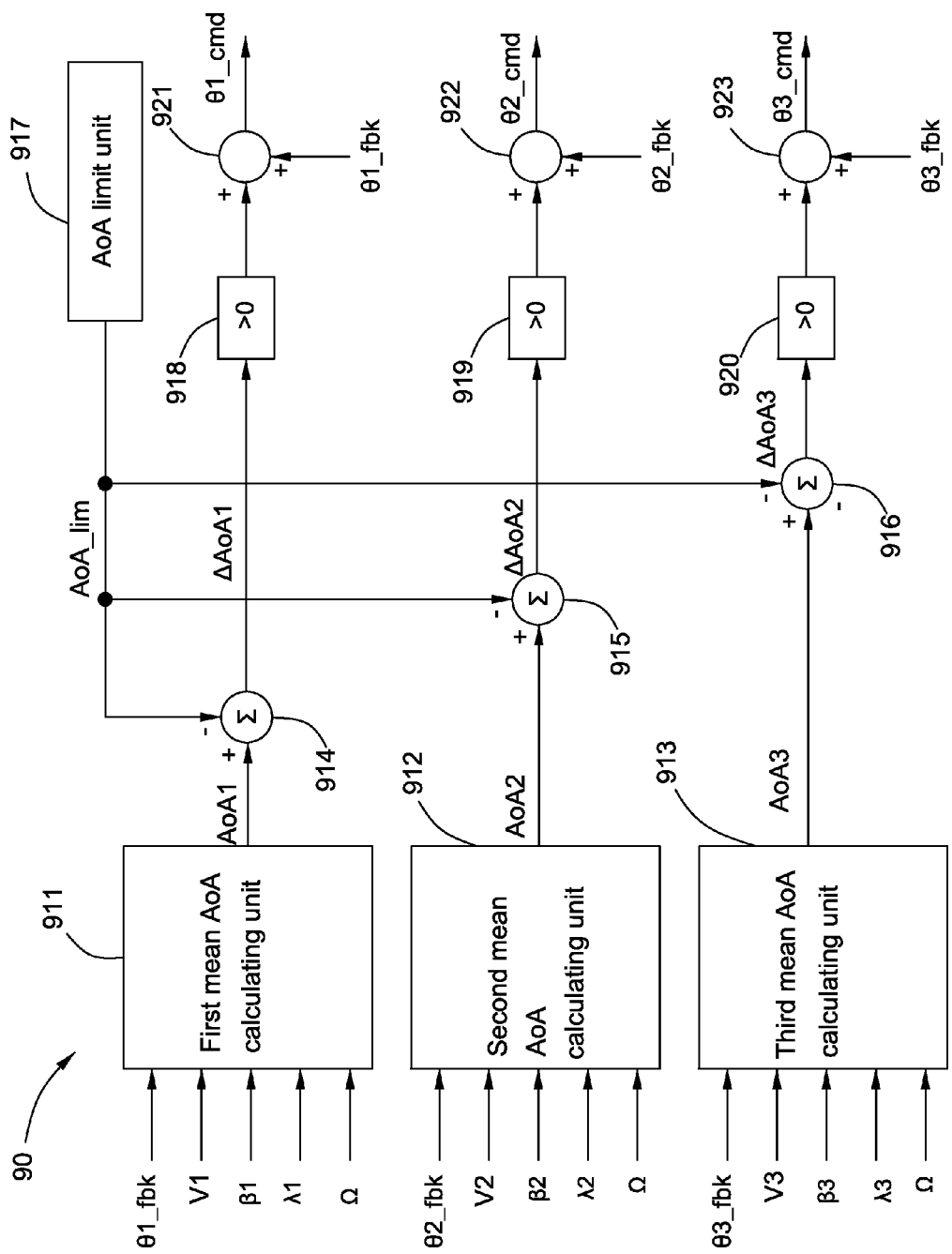
FIG. 9 is a schematic diagram of a control block for mitigating loads during yaw error on a wind turbine, in accordance with another embodiment of the present disclosure.

Referring to FIG. 9, a schematic diagram of a control block 90 of the scheduler 22, for mitigating loads during yaw error on the wind turbine 10 is shown, according to another embodiment. Like the control block 40 of FIG. 4, this control block 90 is also used to provide three pitch angle reference commands ($\theta1\_cmd$, $\theta2\_cmd$, $\theta3\_cmd$) to the controller 26 for every blade 141, 142, 143, but designed as a different configuration. In this illustrated embodiment of FIG. 9, the control block 90 includes a first mean AoA calculation unit 911, a second mean AoA calculation unit 912, a third mean AoA calculation unit 913, three subtraction elements 914, 915, and 916, an AoA limit unit 917, three block elements 918, 919, 920, and three summation elements 921, 922, and 923.

The first mean AoA calculation unit 911 is used to calculate an angle of attack AoA1 corresponding to the first blade 141, based on a pitch angle feedback signals $\theta1\_fbk$, and the parameter signals V1, $\beta1$, $\lambda1$, $\Omega$ mentioned above according to the equations Eq. 1 and Eq. 2. Similarly, the second mean AoA calculation unit 912 is used to calculate an angle of attack AoA2 corresponding to the second blade 141, based on a pitch angle feedback signals $\theta2\_fbk$, and the parameter signals V2, $\beta2$, $\lambda2$, $\Omega$ mentioned above according to the equations Eq. 1 and Eq. 2. The third mean AoA calculation unit 913 is used to calculate an angle of attack AoA3 corresponding to the third blade 143, based on a pitch angle feedback signals $\theta3\_fbk$, and the parameter signals V3, $\beta3$, $\lambda3$, $\Omega$ mentioned above according to the equations Eq. 1 and Eq. 2. The first to third wind speeds V1, V2, V3 may be equal, the first to third wind directions $\beta1$, $\beta2$, and $\beta3$ may be equal in some embodiments.

The AoA limit unit 917 is used to set an AoA limitation value (or a range) for limiting the AoA of every blade under a predetermined maximum limitation value AoA_lim based on the yaw error calculated by the yaw error calculation unit 49 (see FIG. 4), or based on a predetermined yaw error condition. The predetermined maximum limitation value AoA_lim is prestored in the AoA limit unit 917 in advance, and it can be changed according to different conditions, for example if the wind turbine 10 is changed, the predetermined maximum limitation value AoA_lim may be changed accordingly.

The subtraction element 914 is used to subtract the angle of attack AoA1 from the predetermined maximum limitation value AoA_lim and provides a first AoA error $\Delta AoA1$ representing a difference between the angle of attack AoA1 and the limitation value AoA_lim. Similarly, the subtraction element 915 is used to subtract the angle of attack AoA2 from the predetermined maximum limitation value AoA_lim and provides a second AoA error $\Delta AoA2$ representing a difference between the angle of attack AoA2 and the limitation value AoA_lim The subtraction element 916 is used to subtract the angle of attack AoA3 from the predetermined maximum limitation value AoA_lim and provides a third AoA error $\Delta AoA3$ representing a difference between the angle of attack AoA3 and the limitation value AoA_lim.

The block element 918 is used to determine whether the first AoA error $\Delta AoA1$ is greater than zero, and, if so, allow the first AoA error $\Delta AoA1$ to pass through itself to subsequent elements, or, if not, block the first AoA error $\Delta AoA1$. In other words, when the calculated angle of attack AoA1 is greater than the limitation value AoA_lim, there is a need to provide the first pitch angle reference command $\theta1\_cmd$ based on the AoA errors to the controller 26 as mentioned above. In detail, if the calculated angle of attack AoA1 is greater than the limitation value AoA_lim, the first AoA error $\Delta AoA1$ is added into the pitch angle feedback signals $\theta1\_fbk$ through the summation element 921 to become the first pitch angle reference command $\theta1\_cmd$. Similarly, the second and third pitch angle reference command $\theta2\_cmd$, $\theta3\_cmd$ are generated by the block elements 919, 920 and the summation elements 922, 923. In this illustrated embodiment of FIG. 9, the control block 90 acts as the pitch angle reference command calculation unit used to calculate the first to third pitch angle reference commands $\theta1\_cmd$, $\theta2\_cmd$, $\theta3\_cmd$ corresponding to the first to third blades 141, 142, 143 respectively. In other embodiments, the pitch angle reference command calculation unit may be varied based upon different conditions such as the type of the wind turbine or the location of the wind turbine, etc.

Figure 10:
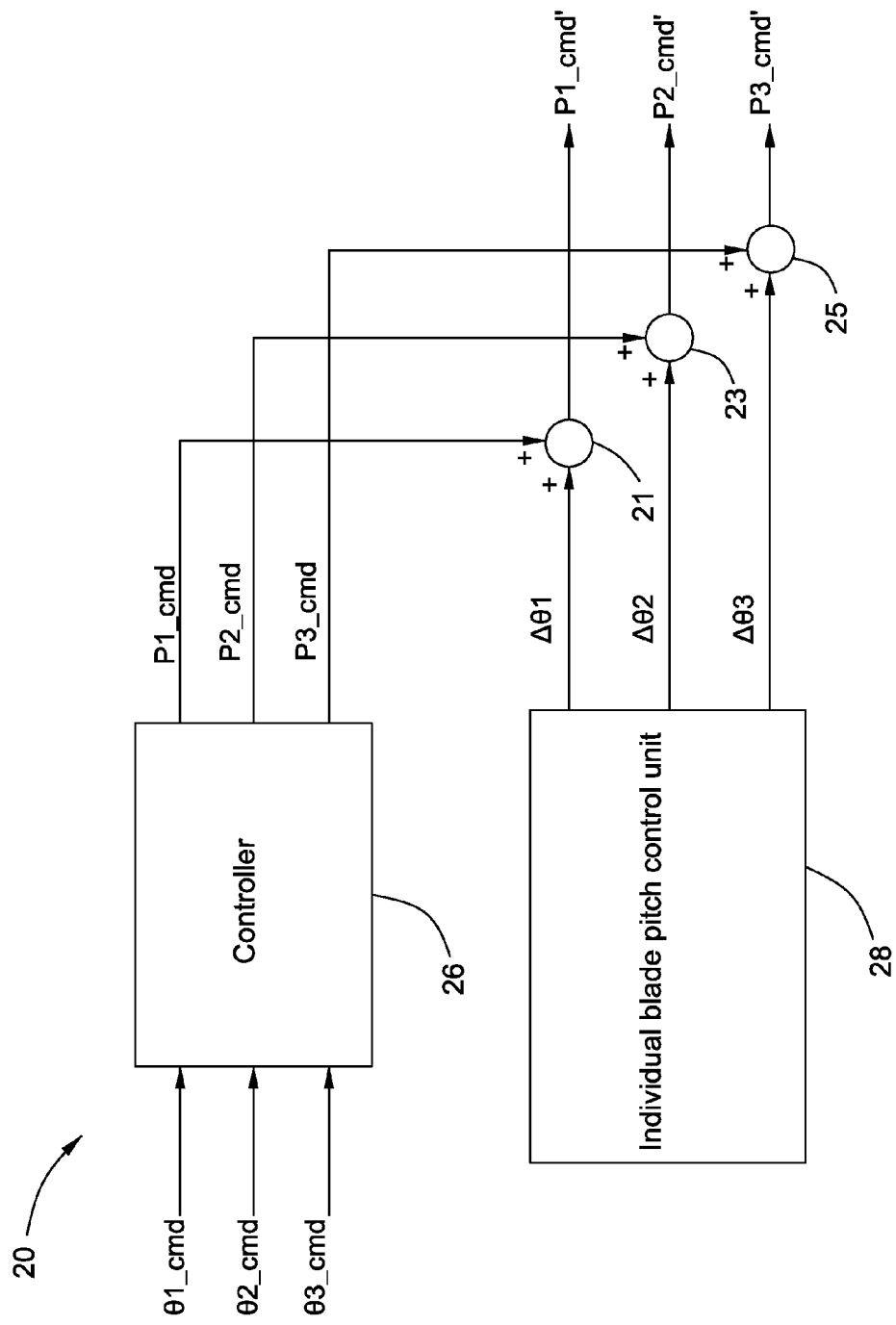
FIG. 10 is a partial schematic block diagram of a control system for mitigating loads during yaw error on a wind turbine, in accordance with at least some embodiments of the present disclosure.

Referring to FIG. 10, a partial schematic block diagram of the control system 20 is shown, in accordance with at least some embodiments of the present disclosure. Compared with FIG. 2, the control system 20 further includes an individual blade pitch control unit 28 for providing further compensation for the pitch commands P1_cmd, P2_cmd, P3_cmd generated by the controller 26. As mentioned above, the controller 26 generates the pitch commands P1_cmd, P2_cmd, P3_cmd based on the calculated pitch angle reference commands $\theta1\_cmd$, $\theta2\_cmd$, $\theta3\_cmd$, and other reference commands, such as the rotor speed reference command $\Omega\_cmd$, the power reference command P_cmd, and a selected control mode reference command, etc. In some embodiments, the pitch commands P1_cmd, P2_cmd, P3_cmd may be equal, called collective pitch commands. For example, if the selected control mode reference command demands power reference tracking, this would typically be achieved by the controller 26 through the collective pitch commands (same pitch angle sent to all three blades) and torque commands. Even through the collective pitch commands P1_cmd, P2_cmd, P3_cmd can mitigate loads during yaw error on the wind turbine 10, further reduction may be achieved by introducing the individual blade pitch control unit 28. In general, the individual blade pitch control unit 28 is used to generate three pitch angle compensation commands Δθ1, Δθ2, Δθ3 to respectively compensate the collective pitch commands P1_cmd, P2_cmd, P3_cmd corresponding to the three blades 141, 142, and 143, which can reduce asymmetric bending loads thereon.

In one embodiment, the control system 20 further includes three summation elements 21, 23, 25, used to compensate the pitch commands P1_cmd, P2_cmd, P3_cmd through the pitch angle compensation commands Δθ1, Δθ2, Δθ3. In detail, the summation element 21 adds the pitch command P1_cmd to the pitch angle compensation command Δθ1, and provides a compensated pitch command P1_cmd' representing a summation of the pitch command P1_cmd and the pitch angle compensation command ΔAθ1. Similarly, the summation element 23 adds the pitch command P2_cmd to the pitch angle compensation command Δθ2, and provides a compensated pitch command P2_cmd' representing a summation of the pitch command P2_cmd and the pitch angle compensation command Δθ2. The summation element 25 adds the pitch command P3_cmd to the pitch angle compensation command Δθ3, and provides a compensated pitch command P3_cmd' representing a summation of the pitch command P3_cmd and the pitch angle compensation command Δθ3.

Figure 11:
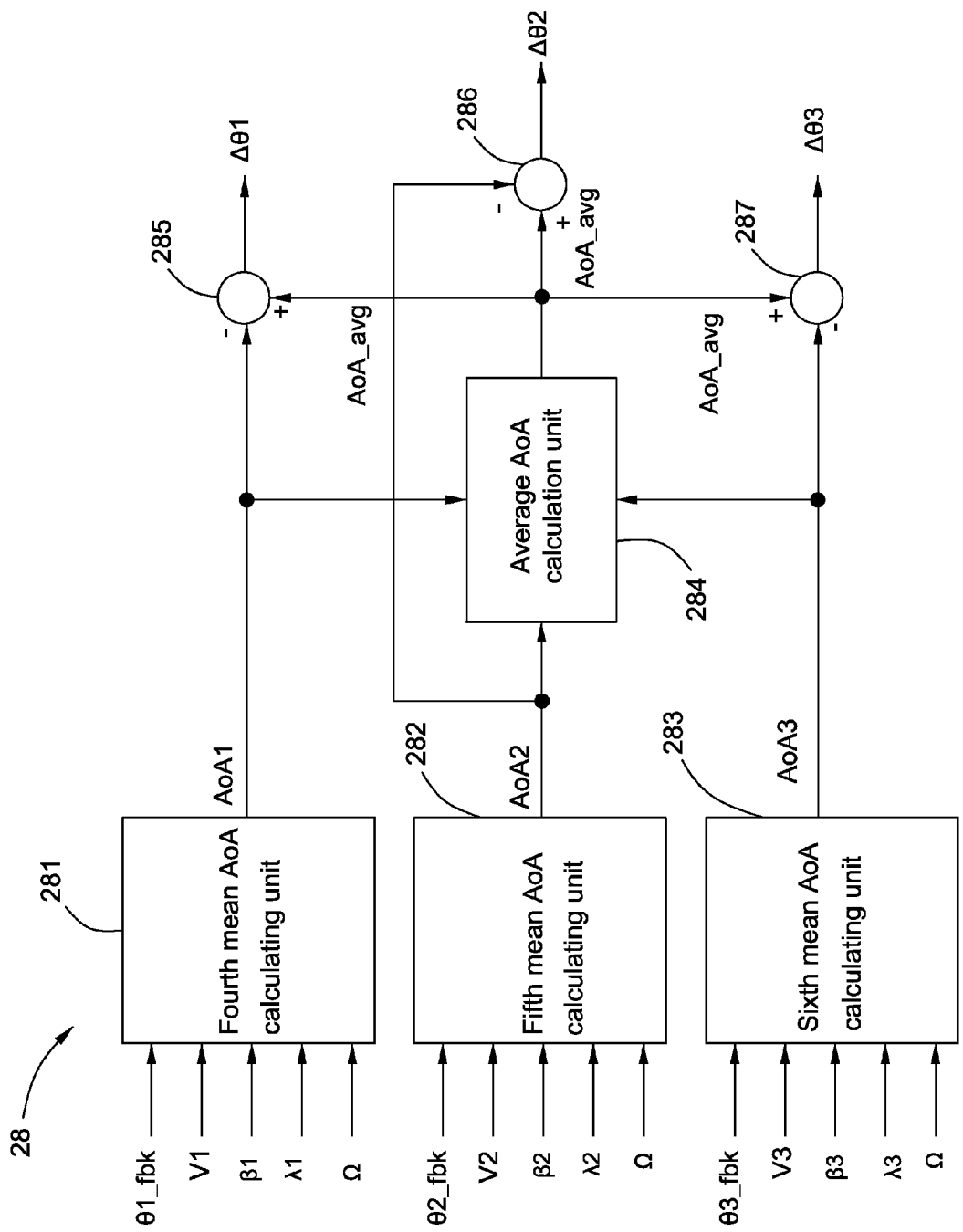
FIG. 11 is a schematic diagram of an individual blade pitch control unit of the control system of FIG. 10, in accordance with one embodiment of the present disclosure.

Referring to FIG. 11, a schematic diagram of the individual blade pitch control unit 28 is shown, in accordance with one embodiment of the present disclosure. The individual blade pitch control unit 28 includes a fourth mean AoA calculation unit 281, a fifth mean AoA calculation unit 282, a sixth mean AoA calculation unit 283, an average AoA calculation unit 284, and three subtraction elements 285, 286, 287. Similar to the embodiment of FIG. 9, the fourth to sixth mean AoA calculation units 281, 282, 283 have the similar function as the first to third mean AoA calculation units 911, 912, 913, and are thus not described here again. Therefore, three angles of attack AoA1, AoA2, AoA3 are determined accordingly. The first to third wind speeds V1, V2, V3 may be equal, the first to third wind directions β1, β2, and β3 may be equal in some embodiments.

The average AoA calculation unit 284 is used to receive the three angles of attack AoA1, AoA2, AoA3, and then calculate an average AoA value AoA_avg by adding three angles of attack AoA1, AoA2, AoA3 and divided by three. The subtraction element 285 subtracts the average AoA value AoA_avg from the angle of attack AoA1 and provides the pitch angle compensation command 401 representing a difference between the average AoA value AoA_avg and the angle of attack AoA1. Similarly, the subtraction element 286 subtracts the average AoA value AoA_avg from the angle of attack AoA2 and provides the pitch angle compensation command Δθ2 representing a difference between the average AoA value AoA_avg and the angle of attack AoA2. The subtraction element 287 subtracts the average AoA value AoA_avg from the angle of attack AoA3 and provides the pitch angle compensation command Δθ3 representing a difference between the average AoA value AoA_avg and the angle of attack AoA3. Referring back to FIG. 10, due to the pitch commands P1_cmd, P2_cmd, P3_cmd being compensated by the pitch angle compensation commands Δθ1, Δθ2, Δθ3, the compensated pitch commands P1_cmd', P2_cmd', P3_cmd' can further mitigate loads during yaw error on the wind turbine 10 based on the compensation of the pitch angle reference commands (θ1_cmd, θ2_cmd, θ3_cmd) and, for example, further avoid flow separation on the three blades 141, 142, 143.

Figure 12:
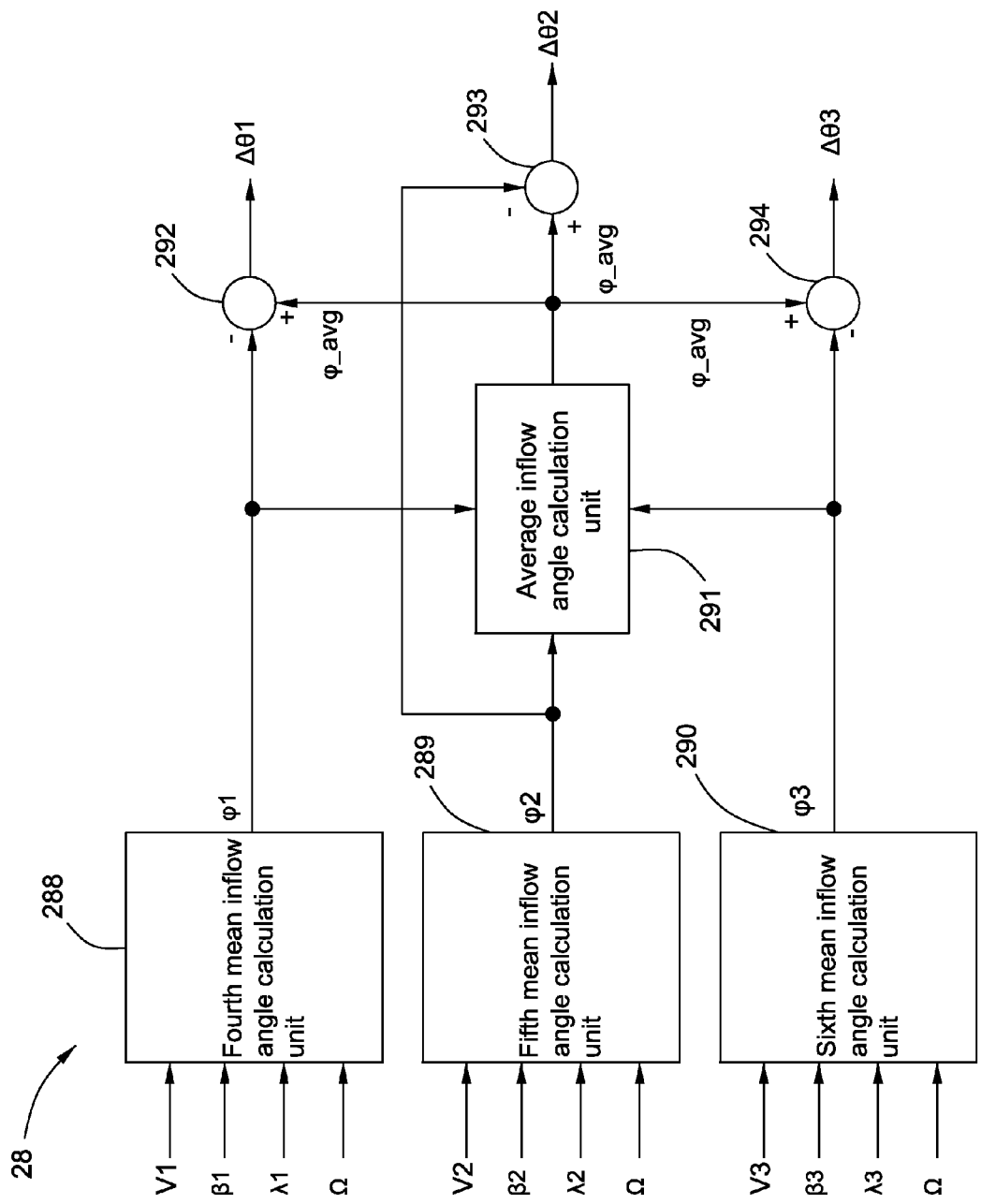
FIG. 12 is a schematic diagram of an individual blade pitch control unit of the control system of FIG. 10, in accordance with another embodiment of the present disclosure.

FIG. 12 shows a schematic diagram of the individual blade pitch control unit 28, in accordance with another embodiment of the present disclosure. Compared with the embodiment of FIG. 11, this embodiment uses a fourth mean inflow angle calculation unit 288, a fifth mean inflow angle calculation unit 289, and a sixth mean inflow angle calculation unit 290, to replace the three units 281, 282, 283 of FIG. 11 and to produce three mean inflow angles φ1, φ2, φ3. The calculation method of the three mean inflow angles φ1, φ2, and φ3 has been described in FIG. 4 and is thus not described here again. Accordingly, an average inflow angle calculation unit 291 is introduced to calculate an average value φ_avg like the average AoA calculation unit 284 of FIG. 11. And three subtraction elements 292, 293, 294 are further introduced to produce three pitch angle compensation commands Δθ1, Δθ2, Δθ3 with similar mode of the embodiments of FIG. 11. In other embodiments, the configuration of the individual blade pitch control unit 28 can be adjusted according to other appropriate compensation algorithms. The first to third wind speeds V1, V2, V3 may be equal, the first to third wind directions β1, β2, and β3 may be equal in some other embodiments.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control system for mitigating loads on a wind turbine comprising a plurality of blades in yaw error events, the control system comprising:
   a yaw error calculation unit for calculating a yaw error of the wind turbine;
   a pitch angle reference command calculation unit for calculating a plurality of pitch angle reference commands respectively corresponding to the plurality of blades at least based on the calculated yaw error, wherein the pitch angle reference command calculation unit comprises
      a plurality of mean inflow angle calculation units for calculating a plurality of respective mean inflow angles corresponding to the plurality of blades; and
      a reference angle of attack calculation unit for calculating a plurality of respective reference angles of attack corresponding to the plurality of blades based on the calculated yaw error and a predefined load limit;
      wherein the plurality of pitch angle reference commands are calculated by calculating the difference between the plurality of mean inflow angles and the plurality of reference angles of attack; and
   a controller for producing a plurality of pitch commands at least based on the plurality of pitch angle reference commands, to respectively regulate the pitch angles of the plurality of blades.

2. The control system of claim 1, further comprising:

a rotor speed command setting unit for calculating a rotor speed reference command at least based on the calculated yaw error; and a controller for producing a rotor speed command, to regulate the rotor speed of the wind turbine at least based on the rotor speed reference command.

3. The control system of claim 1, further comprising:

a power command setting unit for calculating a power reference command at least based on the calculated yaw error; and a controller for producing a power command, to regulate the power of the wind turbine at least based on the power reference command.

4. The control system of claim 1, wherein each of the plurality of mean inflow angle calculation units calculates the corresponding mean inflow angle based on one or more parameter signals from the corresponding blade.

5. The control system of claim 4, wherein the one or more parameter signals comprise wind speed, wind direction, blade azimuth angle, and rotor speed.

6. The control system of claim 5, wherein an inflow angle is calculated based on the equation:

$$\varphi(r) = \tan^{-1}\frac{V\cos\beta}{V\sin\beta\cos\lambda + r\Omega};$$

wherein $\phi(r)$ is the inflow angle on the corresponding blade as a function of a blade span location r of the corresponding blade, V stands for a wind speed, $\Omega$ stands for a rotor speed, $\beta$ stands for a wind direction in inertial reference frame, $\lambda$ stands for a blade azimuth angle.

7. The control system of claim 6, wherein the plurality of pitch angle reference commands θ are calculated based on the equation: $\alpha_m$=mean($\phi(r)$) −θ; wherein $\alpha_m$ stands for the reference angle of attack, mean($\phi(r)$) is a mean value of the inflow angle $\phi(r)$.

8. The control system of claim 7, wherein the mean value of the inflow angle $\phi(r)$ is calculated as the mathematical average value of inflow angles obtained over 60%-90% of that blade span of the corresponding blade.

9. The control system of claim 1, wherein the yaw error calculation unit further provides a shutdown command to shut the wind turbine down when the calculated yaw error is greater than a predetermined maximum allowable yaw error.

10. A control system for mitigating loads on a wind turbine comprising a plurality of blades in yaw error events, the control system comprising:

a yaw error calculation unit for calculating a yaw error of the wind turbine;

a pitch angle reference command calculation unit for calculating a plurality of pitch angle reference commands respectively corresponding to the plurality of blades at least based on the calculated yaw error, wherein the pitch angle reference command calculation unit comprises:

a plurality of mean angle of attack calculation units for calculating a plurality of respective mean angles of attack corresponding to the plurality of blades;

an angle of attack limit unit for setting an angle of attack limitation value based on the calculated yaw error or a predetermined yaw error condition; and a plurality of block elements for blocking the plurality of mean angles of attack when the plurality of mean angles of attack are equal to or less than the angle of attack limitation value;

wherein the plurality of pitch angle reference commands are calculated by calculating the summation of the plurality of mean angles of attack and a plurality of pitch angle feedback signals; and a controller for producing a plurality of pitch commands at least based on the plurality of pitch angle reference commands, to respectively regulate the pitch angles of the plurality of blades.

11. A control method for mitigating loads on a wind turbine comprising a plurality of blades in yaw error events, the control method comprising:

calculating a yaw error of the wind turbine;

calculating a plurality of pitch angle reference commands respectively corresponding to the plurality of blades at least based on the calculated yaw error; and producing a plurality of pitch command sat least based on the plurality of pitch angle reference commands, to respectively regulate the pitch angles of the plurality of blades.

12. The control method of claim 11, wherein calculating a plurality of pitch angle reference commands respectively corresponding to the plurality of blades at least based on the calculated yaw error comprises:

calculating a plurality of respective mean inflow angles corresponding to the plurality of blades;

calculating a plurality of respective reference angles of attack corresponding to the plurality of blades based on the calculated yaw error and a predefined load limit; and calculating the plurality of pitch angle reference commands by calculating the difference between the plurality of mean inflow angles and the plurality of reference angles of attack.

13. The control method of claim 11, wherein calculating a plurality of pitch angle reference commands respectively corresponding to the plurality of blades at least based on the calculated yaw error comprises:

calculating a plurality of respective mean angles of attack corresponding to the plurality of blades;

setting an angle of attack limitation value based on the calculated yaw error or a predefined yaw error;

blocking the plurality of mean angles of attack when the plurality of mean angles of attack are equal to or less than the angle of attack limitation value; and calculating the plurality of pitch angle reference commands by calculating the summation of the plurality of mean angles of attack and a plurality of pitch angle feedback signals.

14. The control method of claim 11, further comprising producing a plurality of pitch angle compensation commands to respectively compensate the plurality of pitch commands, wherein the plurality of pitch angle compensation commands are calculated by calculating the difference between a plurality of respective mean angles of attack or inflow angles of the plurality of blades and the corresponding average value.

15. The control method of claim 14, wherein producing a plurality of pitch angle compensation commands to respectively compensate the plurality of pitch commands comprises:

calculating a plurality of respective mean angles of attack corresponding to the plurality of blades;

calculating an average value of the calculated plurality of respective mean angles of attack; and calculating the plurality of pitch angle compensation commands by calculating the difference between the plurality of respective mean angles of attack and the average value.

16. The control method of claim 14, wherein producing a plurality of pitch angle compensation commands to respectively compensate the plurality of pitch commands comprises:
- calculating a plurality of respective mean inflow angles corresponding to the plurality of blades;
- calculating an average value of the calculated plurality of respective mean inflow angles; and
- calculating the plurality of pitch angle compensation commands by calculating the difference between the plurality of respective mean inflow angles and the average value.

17. A control system for mitigating loads on a wind turbine comprising a plurality of blades in yaw error events, the control system comprising:
- a controller for producing a plurality of pitch commands, to respectively regulate the pitch angles of the plurality of blades; and
- an individual blade pitch control unit for producing a plurality of pitch angle compensation commands to respectively compensate the plurality of pitch commands, wherein the individual blade pitch control unit comprises:
  - a plurality of mean angle of attack calculation units for calculating a plurality of respective mean angles of attack corresponding to the plurality of blades; and
  - an average angle of attack calculation unit for calculating an average value of the calculated plurality of respective mean angles of attack;
  - wherein the plurality of pitch angle compensation commands are calculated by calculating the difference between the plurality of respective mean angles of attack and the average value;
- wherein the plurality of pitch angle compensation commands are calculated by calculating the difference between the plurality of respective mean angles of attack of the plurality of blades and the corresponding average value.

18. A control system for mitigating loads on a wind turbine comprising a plurality of blades in yaw error events, the control system comprising:
- a controller for producing a plurality of pitch commands, to respectively regulate the pitch angles of the plurality of blades; and
- an individual blade pitch control unit for producing a plurality of pitch angle compensation commands to respectively compensate the plurality of pitch commands, wherein the individual blade pitch control unit comprises:
  - a plurality of mean inflow angle calculation units for calculating a plurality of respective mean inflow angles corresponding to the plurality of blades; and
  - an average inflow angle calculation unit for calculating an average value of the calculated plurality of respective mean inflow angles;
  - wherein the plurality of pitch angle compensation commands are calculated by calculating the difference between the plurality of respective mean inflow angles and the average value;
- wherein the plurality of pitch angle compensation commands are calculated by calculating the difference between a plurality of respective mean inflow angles of the plurality of blades and the corresponding average value.

19. The control system of claim 18, further comprising:
- a rotor speed command setting unit for calculating a rotor speed reference command at least based on a calculated yaw error; and
- a controller for producing a rotor speed command, to regulate the rotor speed of the wind turbine at least based on the rotor speed reference command.

20. The control system of claim 18, further comprising:
- a power command setting unit for calculating a power reference command at least based on a calculated yaw error; and
- a controller for producing a power command, to regulate the power of the wind turbine at least based on the power reference command.

* * * * *